United States Patent [11] 3,620,755

[72] Inventor Harold A. Hoffman
 105 Bayeau Road, New Rochelle, N.Y.
 10804
[21] Appl. No. 880,354
[22] Filed Nov. 26, 1969
[45] Patented Nov. 16, 1971
 Continuation-in-part of application Ser. No.
 525,359, Feb. 7, 1966, now Patent No.
 3,485,636, dated Dec. 23, 1969.

[54] HIGH-PROTEIN FOOD
 10 Claims, No Drawings
[52] U.S. Cl. .................................................. 99/17,
 99/98
[51] Int. Cl. .................................................. A23j 1/14

[50] Field of Search ............................................ 99/2, 2 F,
 14, 17, 98

[56] References Cited
 UNITED STATES PATENTS
 3,343,963  9/1967  Kjelson .......................... 99/14
 3,485,636 12/1969  Hoffman ....................... 99/17

Primary Examiner—Raymond N. Jones
Assistant Examiner—James R. Hoffman
Attorney—Hane, Baxley & Spiecens ABSTRACT: A foodstuff of improved taste and consistency is prepared by impregnating soybean meal with an edible oleaginous material and cooking the resulting material in boiling water.

HIGH-PROTEIN FOOD

The present application is a continuation-in-part application based upon my copending application Ser. No. 525,359, filed Feb. 7, 1966 and issued as U.S. Pat. No. 3,485,636 on Dec. 23, 1969.

This invention relates to food. More particularly, it is directed to an improved vegetable protein composition for use in human alimentation.

BACKGROUND OF THE INVENTION

Acute hunger or starvation is both a physical and psychological cataclysm against which the individual violently reacts. All of his resources quickly concentrate on finding food at the expense of his other functions and values. This state of highly magnified nervous excitement, irritability and even sensorial exaltation is rapidly followed by apathy, depression, nausea and inability to concentrate. Such periodic ups and downs succeed each other irregularly, while the body progresses inexorably to wasting edema and death.

Chronic hunger, however, is less spectacular than starvation. It is induced by under-nutrition and/or malnutrition; and its effects are often prolonged and persistent. It has been recently reported by the FAC (Food and Agricultural Organization of the United Nations), that 60 percent of the people of the developing countries are undernourished; that 50 percent of the infants born into the world die before the age of six because of malnutrition (death due to intercurrent infections to which malnutrition has made them very susceptible); and that of those who survive infection, 10 to 25 percent are physically or mentally retarded. Malnutrition, however, is not confined to the developing countries. It exists throughout the world, even in affluent societies.

Chronic hunger (often called hidden hunger because it is usually not recognized as such by sufferers), is due primarily to the lack of nutrition material, such as protein, fat, carbohydrates and adequate supplements of vitamin and minerals in the diet. The lack of sufficient protein is the major source of malnutrition in those societies where it occurs. These usually occur in combination, but each lack produces its own subsequent clinical manifestation.

As has been stated, the most widespread and serious of these hidden hungers is protein deficiency. Protein is characteristic of life, and is an essential component in the structure of protoplasm. Without it there is no life. With insufficient protein life may go on, but at a level far below its potential.

Adequate protein must be available to the human, both in the quantity to meet the minimum daily requirements (MDR), for each age level, and in respect of its biological efficiency. Therefore, there must be present in protein a quantity thereof which is available as a completely biologically efficient protein. In short, it is not the total quantity of protein ingested which counts, rather, it is the protein therein which furnishes the MDR of the proper kind of protein, i.e., the protein which is completely utilized by the body.

Plant, i.e., vegetable protein, can provide means for overcoming the lack of protein in the diet. However, various forms of vegetable protein which have heretofore been proposed for use in human alimentation lack certain important characteristics.

The human derives psychological satisfaction in chewing. In addition to such psychological satisfaction, mastication is a necessary function for activity of the salivary glands and maintenance of adequate dentition. Most of the vegetable protein products heretofore proposed are eaten in the form of mushes and gruels, or powdered supplements added to the staple diets which are usually high in carbohydrate, but deficient in protein. Some people, however, decline to accept such supplements, preferring their customary sources of food (rice, beans, the pastas—which provide carbohydrate but are deficient in protein), served in their traditional fashion.

THE INVENTION

It is a principal object of the invention to provide a novel, highly nutritious food product suitable for use in human alimentation and based on vegetable protein.

Another object of the invention is to provide a food product of the general kind above referred to which has a nutritional content superior to or at least equal to average beef or other commonly consumed meat and is based on proteinaceous oleaginous seeds such as soybeans, peanuts and related seeds that are readily and inexpensively available.

Still another object of the invention is to provide compositions based on vegetable proteins which approach flesh meats in physical structure and taste so that they can be chewed with all the advantages arising from their masticability and nutritional efficiency.

A further object of the invention is to provide a vegetable protein based food in a variety of forms ranging from one that is ready-for-cooking with water to one that is ready-to-eat (cold or heatable).

A still further object of the invention is to provide a vegetable protein based food which has a long shelf life if sterilized and canned or otherwise sealed.

SUMMARY OF THE INVENTION

There is known from U.S. Pat. No. 2,162,729 an animal feed material manufactured by subjecting solvent-extracted protein-aceous soybean meal, peanuts or other related means containing some moisture to pressure for a time and at an elevated temperature sufficient to convert the moisture in the meal into steam thereby debittering the meal, and to compact the meal particles by application of pressure from 2,000 to 5,000 pounds per square inch. Pressure much below 2,000 pounds per square inch, such as pressure below 1,800 pounds tends to result in fairly loose pellets or particles of soy bean meal rather than in the desired densely compacted mass; pressure above 5,000 pounds per square inch may be used, but is generally not necessary and hence uneconomical.

Due to the extremely high compression to which the meal is subjected in conjunction with the removal of moisture by the action of the elevated temperature applied during compression, the meal particles are virtually fused or plasticized together in the form of a practically solid, very hard or horny and tough mass or cake, which can be fragmented into pieces or chunks of desired size. The mass also acquires a fiberlike consistency which is similar to the fibrous texture of flesh meat and is advantageous for the purpose of the invention, as will be more fully explained hereinafter.

As is evident, the chunks or pieces into which the mass is fragmented contain all the protein and other nutritional contents of the starting material. However, the physical characteristics of the chunks and or pieces make the same totally unsuitable for human alimentation. They are not palatable and cannot be chewed; in fact they are so hard that it is difficult even for animals to masticate the chunks.

It occurred to me that if it were possible to cook the pieces and to maintain the general shape thereof even though they were hydrated, without disintegration, and furthermore to include therewith additional nutrients as well as flavor-imparting substances, the resultant product possesses the requisite nutritional properties, coupled with desirable palatability and chewability.

I sought for means whereby I could obtain a substantially uniform hydration of the pieces during the cooking operation for the purpose of permitting penetration of water into all parts of the chunks or pieces to be cooked via the naturally occurring fissures or ducts in the chunks or pieces. I found that by impregnating the pieces prior to cooking with an edible oil or a liquefied fat (hereinafter referred to as oleaginous material), I obtained a product which, when subsequently cooked with water underwent uniform hydration. The function or action of the oleaginous material effects a coating on both external and internal surfaces thereby delaying hydration with cooking until the water has had sufficient time to make contact with all available to be cooked surfaces. As a result, cooking occurs uniformly and rapidly, produces finished cooked pieces which are uniformly softened and hence chewable, yet do not disintegrate into a mush or gruel but retain their general initial shape though enlarged 2 to 4-fold in volume.

As it is now apparent, the oleaginous material is not introduced the chunks or pieces to effect hardening or binding actions—as has been practiced in the past to harden or bind loosely compacted particles as are found in pellets but rather to effect a more uniform and therefore more rapid rate of hydration when subsequently cooked. I have found that without such treatment hydration tends to be limited to the surface layer of the pieces unless cooking is continued until the chunks or pieces disintegrate.

An oil-in-water emulsion instead of oil alone may also be used for coating the external and internal surfaces of the compacted pieces. The temperature of the emulsion must be maintained at a nonreacting range, such as a temperature between about 120° F. and the temperature at which the emulsion still remains in the liquid stage. It has been found that the use of such emulsion improves in some instances the rapidity of the penetration of the oil into the pieces during the coating step thereby causing a more uniform hydration during subsequent boiling of the pieces.

The pieces impregnated with the emulsion are preferably permitted to dry before being boiled unless boiling immediately follows the treatment with emulsion.

I further found that I could include in the cooking water, nutritional and/or flavoring materials such as hydrolyzed vegetable protein, some salt and caramelized sugar to obtain chunks which were markedly palatable, readily chewable, and of noticeably attractive appearance—resembling chunks of roasted or braised beef and most important, equal or even superior in food value to average beef.

In my continued investigations I also found that the dry pieces, (although fat or oil-impregnated), when admixed with water in which was distributed hydrolyzed vegetable protein, salt, caramelized sugar, or any other supplementary nutritional materials, could be filled into cans; sealed hermetically; and heated under pressure (with simultaneous preservation by sterilization), to effect conversion into the above described palatable chunks. Thus, a notably valuable food was made available that could be stored for prolonged periods of time (the same as other canned foods); and could be eaten either cold upon removal from the can, or upon heating depending upon the preference of the consumer.

These palatable chunks may be admixed readily with high-carbohydrate staple foods to provide a diet of requisite protein levels in lieu of the supplementation with protein powders, gruels, etc. which many peoples refuse to use.

I further found that the dry, fat-impregnated pieces could be admixed with hydrolyzed vegetable protein powder, salt, powdered caramelized sugar, etc. and that such admixture could be put up either in bulk packages, or institutional or individual consumer sizes. In consequence thereof, measured amounts of the dry product can be cooked with the requisite quantities of water to produce the ready-to-eat food. Accordingly, the dry product can be bulk-processed in a cannery, to produce the cans above described—or simply cooked in a pot by the consumer to be eaten upon preparation.

I have found that any edible oleaginous material, i.e., edible oils or edible fats in liquid form may be used to provide the oleaginous impregnant. I prefer, however, to use coconut oil (melting point 76° F.) for that purpose, particularly because of its stability.

The proportions of the components of the product of the invention are as follows:

A NONHYDRATED PRODUCT

|  | Suitable Range | Preferred |
| --- | --- | --- |
| Toasted, debittered soy meal | 50-75 parts | 64 parts |
| Oleaginous material | 12-30 parts | 23 parts |
| To such product there is added: |  |  |
| Hydrolyzed vegetable protein |  | 7.0 parts |
| Salt |  | 1.3 parts |
| Caramelized sugar |  | 2.25 parts |
| Sugar |  | 1.3 parts |

A HYDRATED PRODUCT

When the hydrated product is canned, the proportions of the components of the canned product is as follows:

|  | Suitable Range | Preferred |
| --- | --- | --- |
| Toasted, debittered soy meal | 10-30 parts | 25 parts |
| Oleaginous material | 4-12 parts | 9 parts |
| Water | 35-80 parts | 61 parts |
| To such product there is added: |  |  |
| Hydrolyzed vegetable protein |  | 3.0 parts |
| Salt |  | 0.5 parts |
| Caramelized sugar |  | 0.9 parts |
| Sugar |  | 0.5 parts |

The following are examples in accordance with this invention:

EXAMPLE 1

The pressed cake of disembittered (debittered) solvent-extracted soybean meal prepared as described in U.S. Pat. No. 2,162,729 is broken into pieces. Although the pieces may vary in size from 2 grams to 500 grams, I prefer pieces varying in size from that of a hazelnut to a walnut.

100 kilos of the pieces are placed in a vessel to which is then added 36 kilos of liquefied 76° F. coconut oil, held at a temperature of 120°-180° F. The mass is tumbled until the pieces becomes completely impregnated by the coconut oil. The impregnated pieces have an almost dry appearance. Then there is added to the mass the following mixture:
Hydrolyzed vegetable protein—12 kilos
Salt—2 kilos
Caramelized sugar—3 kilos
Sugar—2 kilos The fat-impregnated pieces and the mixture just described are further tumbled until the mass acquires a uniform color, which is indicative of uniform distribution of the added material to the coated pieces. The mass is then added to 245 kilos of water and boiled for 30 minutes. The mass if then filled into cans in accordance with conventional canning procedures, and the cans are sterilized.

EXAMPLE 2

A dry formulation has the following composition:
Toasted disembittered (debittered) soy meal—64 kilos
76° F. coconut oil—23 kilos
Hydrolyzed vegetable protein—0.8 kilos
Salt—1.3 kilos
Caramelized sugar—2.25 kilos
Sugar—1.3 kilos The foregoing ingredients are combined as described in example 1, and packaged in containers of various sizes. The packaged product can be cooked with water as described above.

The cooking time required for thoroughly softening and rendering chewable the oil impregnated chunks varies with the size of the chunks, as is apparent from the subsequent "-

COOKING STUDY" which also lists the increase in volume as caused by the cooking.

COOKING STUDY

| | Dry | | | Cooked | | | |
|---|---|---|---|---|---|---|---|
| Number of pieces | Weight (gm.) | Volume (ml.) | Measurement(in.) | Cook time (min.) | Weight (gm.) | Volume (ml.) | Measurement (in.) |
| 12 | 28.60 | 20 | ½x¾ | 20 | 55.5 | 48 | ⅝x1 |
| | | | | 40 | 59.1 | 54 | ¾x1 1/16 |
| | | | | 60 | 54 | 48 | 7/16 x 1⅛ |
| 12 | 62.50 | 50 | 1x1¼ | 30 | 117 | 180 | 1¼x1½ |
| | | | | 60 | 144 | 210 | 1¼x1⅝ |
| | | | | 75 | 132.6 | 135 | 1½x2 |
| 12 | 140.50 | 110 | 1¼x2¼ | 30 | 243 | 210 | 1½x2½ |
| | | | | 60 | 262.5 | 240 | 1⅜x2¾ |
| | | | | 120 | 318 | 285 | 1½x2½ |

Measurements:
   Weight: Directly on analytical scale.
   Volume: Non-reacting medium in graduated cylinder—Increase in volume by dropping 12 pieces into cylinder with alcohol and measuring volume increase.
   Lin. Measure: Length by width in inches.

The amount of the oleaginous material and/or water, in any of the products above described, can be varied from that mentioned above—so as to produce a product of desired consistency. Thus, it is possible to produce a range of products extending from one virtually devoid of free liquid, to one which consists of the chunks in a gravylike medium containing part of the vegetable protein hydrolyzate, salt, caramelized sugar, etc. The quantity and the character of the medium depend upon the quantities of the fat and the water fractions thereof.

ANALYSIS AND COMPARISON OF VEGETABLE FOOD PER INVENTION WITH BEEF

| | 24.18% Protein | 16.12% Protein | Dehydrated Base | Beef |
|---|---|---|---|---|
| Protein | 24.18% | 16.12% | 40.30% | 21.2% |
| Fat | 9.48% | 6.32% | 15.80% | 7.5% |
| Carbohydrates | 14.83% | 9.88% | 24.71% | 0 |
| Mineral Ash | 7.10% | 4.74% | 11.84% | 1.3% |
| Fiber | 1.10% | 0.73% | 1.83% | 0 |
| Moisture | 43.31% | 62.21% | 5.52% | 70.0% |
| Weight of Protein per per Unit weight of Finished Product Shown | 27.42 gm. per 4 oz. | 27.42 gm. per 6 oz. | 43.70 gm. per 4 oz. | 24.04 gm. per 4 oz. |
| Calories per 100 gms | 237.71 | 158.48 | 395.28 | 152.30 |

It will be apparent from the foregoing that a valuable protein food now has become available; and that such food is prepared by:

a. Impregnating, preferably completely, i.e., to saturation, pieces of the pressed cake (described above), with an edible oleaginous material, preferably coconut oil; and b. Effectuating the hydration of the impregnated pieces by cooling them with water, (whereby they absorb water), in the presence of additional nutritional and, optionally, flavoring materials, to satisfy the palates of consumers, with resultant production of chunks of a food which approaches flesh meats in structure and taste—such as chunks of roasted or braised meats.

To sum up, the process of the invention produces an edible, palatable, chewable, readily digestible and highly nutritional food product in the form of chunks or pieces of a size as generally used in stews, or of other preferred size. Finally, it may be pointed out that the finished chunks, in addition to constituting a valuable food for human alimentation, are also highly useful as animal feed for essentially carnivorous animals such as dogs and cats and for herbivorous animals such as beef cattle and horses.

What is claimed is:

1. A method of preparing an improved food product in the form of palatable and chewable chunks for use in human alimentation, which consists essentially in the steps of:

subjecting solvent-extracted meal of edible proteinaceous seeds selected from the group consisting of soy beans and peanuts and containing moisture to a pressure of at least 1,800 pounds per square inch for a time and at a temperature sufficient to convert the moisture into steam whereby the meal is debittered and compacted into a hard and substantially fused mass of generally fiberlike characteristics;

fragmenting the mass into chunks of selected size;

impregnating the chunks with an edible oleaginous material for a time and at a temperature effecting absorption of the oleaginous material substantially throughout the chunks but substantially retaining the initial shape and hardness thereof; and cooking the impregnated chunks in water for a period of time selected in accordance with the size of the impregnated chunks and sufficient to soften said chunks to chunks of chewable consistency having the general shape of the starting chunks but with an increased volume.

2. The method according to claim 1 wherein the applied pressures are between 2,000 and 5,000 pounds per square inch.

3. The method according to claim 1 wherein the chunks are impregnated with an edible oil-in-water emulsion.

4. The method according to claim 1 wherein the edible oleaginous material is coconut oil.

5. The method according to claim 1 wherein there is added to the water prior to cooking at least one of: hydrolyzed vegetable proteins, caramelized sugar and salt.

6. A food product in the form of palatable and chewable chunks for use in human alimentation produced by the process of claim 1.

7. A method of preparing an improved food product for use in human alimentation which consists essentially in the steps of:

a. impregnating solvent-extracted substantially solidly compacted soybean meal chunks of a fused fiberlike structure with an edible oleaginous material for a time and at a temperature sufficient to coat the surface layer of the chunks and also fissures and ducts naturally occurring therein, thereby promoting penetration of water into all parts of the chunks; and b. cooking the oleaginous impregnated soybean meal chunks in water for a period of time selected in accordance with the size of the chunks and sufficient to soften the chunks throughout whereby the resulting product emerges in the form of chewable chunks having the general shape of the chunks prior to cooking and an increased volume.

8. The method according to claim 7 wherein the solvent-extracted soybean meal is debittered.

9. The method according to claim 7 wherein the edible oleaginous material is coconut oil.

10. The method according to claim 7 where there is added to the water prior to cooking at least one of: hydrolyzed vegetable proteins, caramelized sugar and salt.

* * * * *